June 24, 1924.

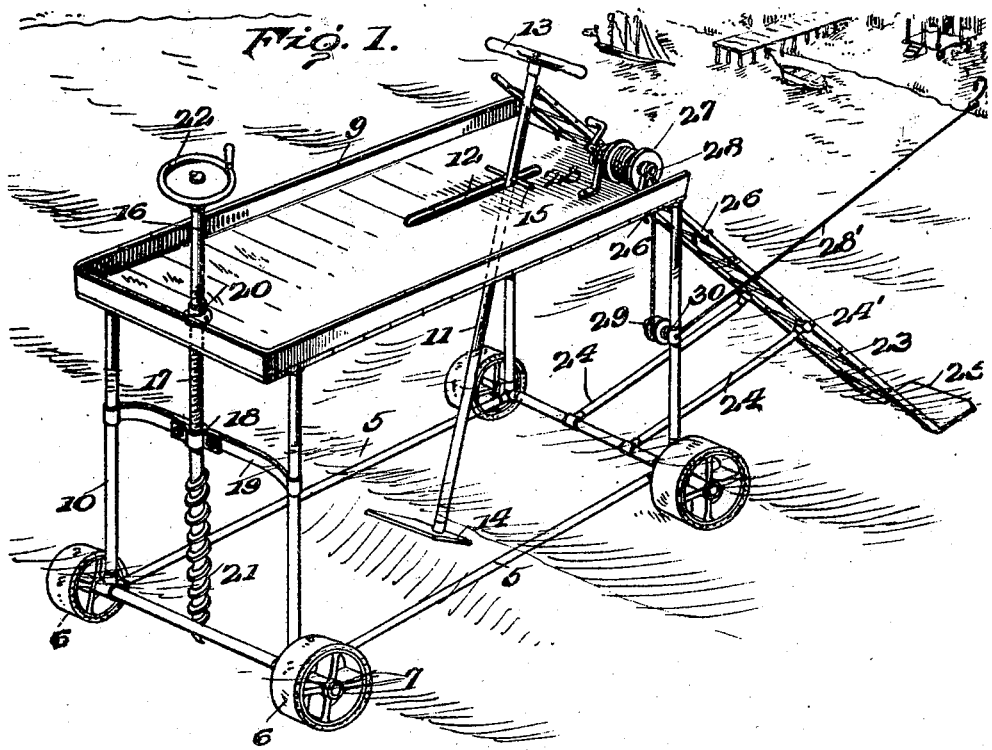
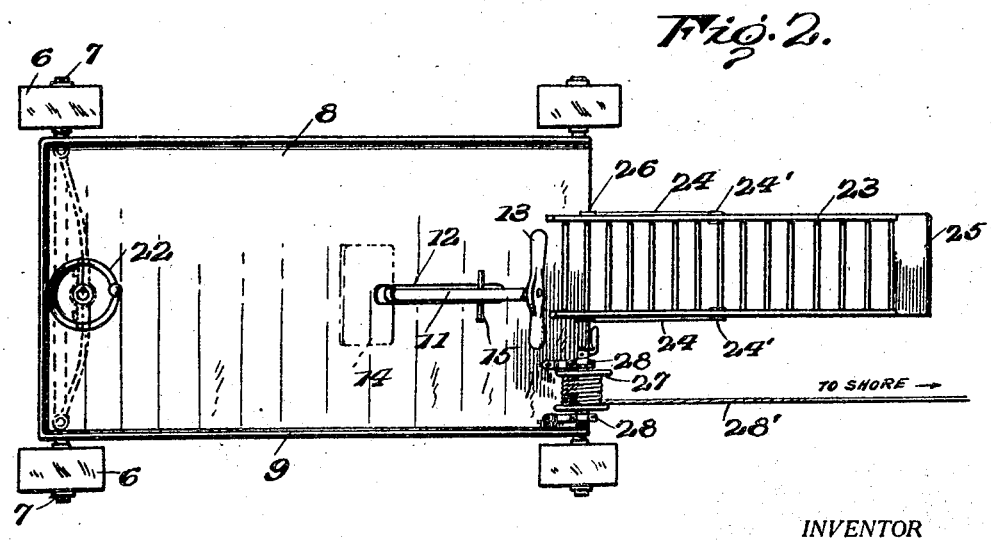

G. R. BLOMBERG

FISHING APPARATUS

Filed July 17, 1923          2 Sheets-Sheet 2

1,498,777

Fig. 3.

INVENTOR
Gustave R. Blomberg
BY
Ralph L Burch
ATTORNEY

Patented June 24, 1924.

1,498,777

UNITED STATES PATENT OFFICE.

GUSTAVE ROBERT BLOMBERG, OF BROOKLYN, NEW YORK.

FISHING APPARATUS.

Application filed July 17, 1923. Serial No. 652,101.

*To all whom it may concern:*

Be it known that GUSTAVE R. BLOMBERG, citizen of the United States, residing at Brooklyn, in the county of Kings and State of New York, has invented certain new and useful Improvements in Fishing Apparatus, of which the following is a specification.

My invention relates to fishing apparatus and more particularly to a fishing truck especially adapted for use in waters unnavigable by fishing boats.

The primary object of the invention is to provide a fishing truck having anchoring means for permanently securing the truck a suitable distance from the shore, whereby it will not be disturbed by the movement of the waves.

A further object of the invention is to provide a machine of the above-mentioned character having manually actuated propelling means for moving the truck forward and means for drawing the truck backwards.

Other objects and advantages of the invention will be apparent during the course of the following description.

In the accompanying drawings, forming a part of this specification and in which like numerals are employed to designate like parts throughout the same, Figure 1, is a perspective view of the invention in use, Figure 2, is a plan view of the same, and, Figure 3, is a side elevation of the invention partly in section.

In the drawings, wherein for the purpose of illustration, I have shown a preferred embodiment of my invention, the numeral 5 designates a rectangular metal frame supported by wheels 6 mounted on stub axles 7. The frame 5 carries an elevated platform 8 surrounded by a suitable railing 9 and supported by upright posts 10 joined to the corners of the frame. This construction provides a substantial seafaring truck which can be propelled over the bed of the ocean. The truck is propelled through the water by the manually actuated push rod 11, disposed in the longitudinal slot 12 of the platform 8. The upper end of the rod 11 is provided with a suitable handle 13 and the lower end with a bearing plate 14, which is thrust against the bed of the ocean to impart movement to the truck. A pin 15 passes through the rod 11 above the slot 12, limiting the movement of the same.

An anchoring rod 16 is positioned adjacent one end of the truck and is adapted to firmly secure the truck against movement. A portion of the rod is provided with screw-threads 17 engageable with the screw-threads of the bearing 18 carried by the curved horizontal bar 19 bridging the end posts 10. The upper end of the rod passes through an opening 20 in the platform and is equipped with a turn wheel 22. The lower end of the rod is provided with a relatively wide spiral flange 21 adapted to be screwed into the ocean-bed through the movement imparted thereto by the turn wheel 22 and the screw threads 17.

A rigid ladder 23 is angularly disposed at the opposite end of the truck, being braced by the forwardly extending supports 24 secured to the end of the frame 5. These supports are spaced apart and have their free extremities 24' grooved to provide guideways for the sides of the ladder when it is being raised or lowered. The lower end of the ladder is provided with a plate 25 which prevents the ladder from sinking in the bed of the ocean. While the truck is moving the ladder is raised and supported by hooks 26 which are adapted to engage the platform.

A winch 27 is mounted in bearings 28 on the platform to one side of the ladder. A wire cable 28' is wound on the winch and trained over the pulley 29 mounted on the shaft 30 projecting from the post 10. An anchor 31 is attached to the free end of the cable for securing the latter to the shore.

In use, the truck is propelled by the push rod 11 through the water, a suitable distance from the shore, after the cable 28' has been secured to the shore by the anchor 31. The anchoring rod 16 is then screwed into the bed of the water holding the truck securely in place, so it will not be affected by the action of the waves. The elevated platform will provide a suitable place from which the fishing lines may be cast. The platform is provided with a ladder so it may be conveniently reached. When it is desired to return the truck to the shore, the cable 28' is wound on the winch 27, thus moving the truck backwards.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus fully described my invention what I claim is:—

1. A fishing truck comprising a wheeled frame, an elevated platform carried by said frame, anchoring means for securing said truck in the water, a winch mounted on said platform, a cable wound on said winch having one end secured to the shore, and propelling means for moving said truck through the water.

2. A fishing truck comprising a chassis, an elevated platform carried by said chassis, a screw rod for anchoring said truck in the water, a winch mounted on said platform, a cable wound on said winch having one end secured to the shore, a ladder adjustably connected with one end of the truck and propelling means for moving said truck through the water.

3. A fishing truck comprising a chassis, an elevated platform carried by said chassis having a central longitudinal slot, anchoring means mounted at one end of the platform, a winch mounted on said platform, a cable wound on said winch having one end secured to the shore, a push rod movably mounted in said slot, and a bearing plate attached to the lower end of said rod.

4. A fishing truck comprising a chassis, an elevated platform carried by said chassis having a longitudinal slot, a winch mounted on said platform, a cable wound on said winch having one end secured to the shore, and a push rod movably mounted in said slot.

In testimony whereof I affix my signature.

GUSTAVE ROBERT BLOMBERG.